United States Patent [19]

Hodgson

[11] 4,318,948
[45] Mar. 9, 1982

[54] ARTICLE COMPRISING CARBON FIBRES AND METHOD OF PRODUCING THE ARTICLE

[75] Inventor: Edward R. Hodgson, Birmingham, England

[73] Assignee: Fordath Limited, West Bromwich, England

[21] Appl. No.: 192,692

[22] Filed: Oct. 1, 1980

[30] Foreign Application Priority Data

Oct. 16, 1979 [GB] United Kingdom ............... 25945/79

[51] Int. Cl.³ .......................... B32B 1/00; B32B 1/10
[52] U.S. Cl. ..................................... 428/68; 156/172; 156/185; 156/188; 156/280; 264/29.5; 264/81; 423/447.1; 423/447.2; 427/249; 428/109; 428/113; 428/192; 428/247; 428/255; 428/365; 428/367; 428/377; 428/408

[58] Field of Search ............... 428/245, 246, 408, 367, 428/373, 374, 377, 247, 235, 68; 427/180, 249; 264/81, 29.2, 29.5; 423/447.1, 447.2; 156/172, 280, 185, 188

[56] References Cited

U.S. PATENT DOCUMENTS

| 3,466,219 | 9/1969 | Schwartz | 428/68 |
| 4,029,829 | 5/1977 | Weaver et al. | 428/408 |
| 4,092,453 | 5/1978 | Jonda | 428/408 |
| 4,182,495 | 1/1980 | Borgmeier et al. | 428/408 |
| 4,187,932 | 2/1980 | Zarembka | 428/408 |

*Primary Examiner*—James J. Bell
*Attorney, Agent, or Firm*—Merriam, Marshall & Bicknell

[57] ABSTRACT

A carbon fibre reinforced carbon article is prepared by wrapping carbon fibre cloth around a carbon fibre reinforced carbon core and then depositing elemental carbon on the core and in the cloth to bond the cloth to the core, leaving substantial interstices in the covering layer of cloth.

8 Claims, 1 Drawing Figure

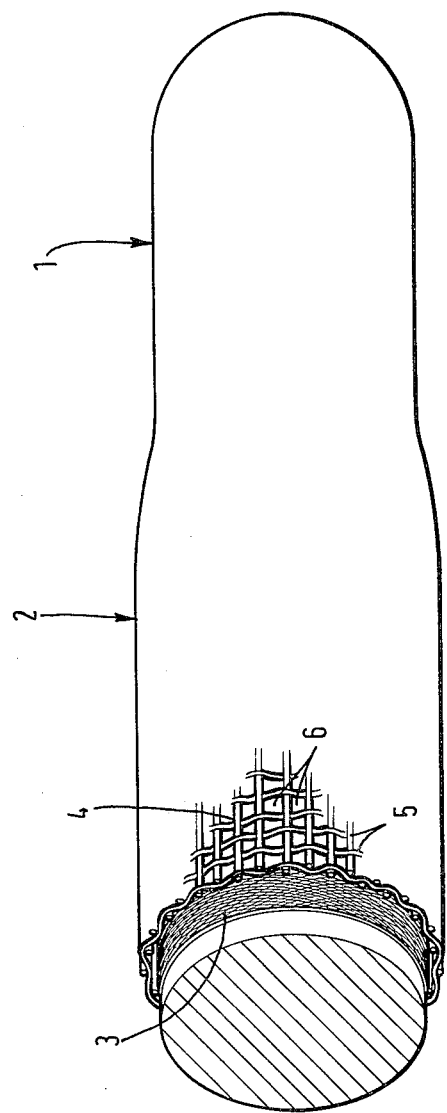

ARTICLE COMPRISING CARBON FIBRES AND METHOD OF PRODUCING THE ARTICLE

BACKGROUND TO THE INVENTION

The invention relates to an article comprising carbon fibres which are bonded by carbon and to a method of producing an article comprising carbon fibres bonded by carbon.

It is known to use carbon fibres for reinforcing a matrix. One material from the which the matrix has been formed is carbon. In one common method of producing carbon fibre reinforced carbon, carbon fibres which have been coated with an organic resin are laid in a mould and the mixture of the fibres and resin is then compressed and heated to cause the organic resin to bind the fibres into a coherent body. This body is then further heated to carbonize the organic resin and thereby convert the deposit on the carbon fibres to carbon which binds the fibres together. Compression of the mixture of resin and fibres in the mould eliminates the presence of voids in the moulded mass and thereby contributes to the strength of the finished article. Strength is one of the main attributes of carbon fibre reinforced carbon.

Carbonization of the resin imparts a porous character to the article, volatile products of the carbonisation of the resin escaping through the pores and through any shrinkage cracks which are formed. The pores which result from carbonisation of the resin typically have cross-sectional dimensions of about three to five micron. An article having pores which generally have cross-sectional dimensions of less than ten micron is described herein as microporous.

Shrinkage cracks are likely to occur in any resin-rich region, that is a region substantially free of carbon fibre reinforcement. The cracks may have a width up to about 400 micron, depending upon the proportion of resin in the material occupying the region concerned.

It is known to increase the density of and improve the bonding of the fibres in microporous carbon fibre reinforced carbon by depositing further carbon in the pores and in any cracks. Carbon may be deposited in the pores (and cracks) by impregnating the article with a further quantity of organic resin and subsequently carbonising the resin or, alternatively, by depositing carbon in the pores (and cracks) from carbonaceous substances in the gaseous state. The latter technique is known as carbon vapour deposition. By one or other or a combination of these techniques, the pores (and cracks) are substantially filled so that the finished article does not have significant porosity.

SUMMARY OF THE INVENTION

According to a first aspect of the present invention, there is provided an article comprising a core covered by a covering layer, the covering layer comprising carbon fibres bonded by carbon to the core and there being between some adjacent fibres of the covering layer substantial interstices.

By the qualification "substantial" we intend to differentiate between the interstices present in the covering layer and the pores of microporous carbon fibre reinforced carbon hereinbefore mentioned. The cross-sectional dimensions of the interstices exceed ten micron and preferably exceed 150 micron.

The substantial interstices in the covering layer of an article in accordance with the first aspect of the invention also differ from the shrinkage cracks hereinbefore mentioned. The boundaries of the interstices of the covering layer are generally defined by carbon fibres, preferably present in carbon fibre reinforced carbon. The boundaries of shrinkage cracks in the prior art carbon fibre reinforced carbon bodies are defined by carbon which does not contain substantial carbon fibre reinforcement. Furthermore, the length of a shrinkage crack exceeds by many times the width of the crack; whereas the shape of the interstices of the covering layer in the present invention preferably approximates more nearly to a square.

There is preferably present in the covering layer carbon which has been deposited by carbon vapour deposition.

In the covering layer, each tow of fibres is preferably incorporated in a substantially non-porous mass of carbon fibre reinforced carbon, said substantial interstices being defined between adjacent tows.

By a tow we mean a group of adjacent fibres which are substantially parallel to each other.

The covering layer may comprise first and second sets of tows with the tows of the first set crossing the tows of the second set.

The covering layer may comprise one or more further sets of tows, the or each further set lying between the core and the first and second sets of tows.

The core of the article is preferably formed of carbon fibre reinforced carbon having no substantial interstices. The core preferably has little or no significant porosity.

According to a second aspect of the invention, there is provided a method of applying the covering layer to the core of an article according to the first aspect of the invention, wherein carbon fibre tows are wrapped around the core in a manner such that each tow crosses other tows and elemental carbon is then deposited on the fibres and on the core to bind the fibres to the core.

The elemental carbon may be deposited by carbon vapour deposition. Alternatively, the elemental carbon may be deposited on the fibres and on the core by carbonisation of carbonaceous material with which the tows and/or the core have been coated.

There may be wrapped around the core a pre-woven cloth or braid comprising tows of carbon fibres which cross each other.

A plurality of wrappings may be applied to the core one over the other, each wrapping comprising carbon fibre tows which cross each other. In such a case, the wrapping which is nearest to the core is preferably bonded by elemental carbon to the core prior to application of the overlying wrapping. Each of a plurality of wrappings is preferably bonded by elemental carbon prior to the application of an adjacent overlying wrapping.

The or each wrapping tow may be partly or fully impregnated with resin and/or a mixture of carbon and resin. Such impregnation may be effected either before or after applying the wrapping to the core or to an underlying wrapping.

In all cases, there is deposited on the carbon fibres by carbon vapour deposition, by carbonation of resin or by impregnation with resin containing carbon, sufficient carbon to form a bond between adjacent tows where they cross each other. It will be understood that tows within a single wrapping cross each other and that, in a case where a plurality of wrappings is applied, tows of one wrapping will cross tows of an adjacent wrapping.

In a case where the core of the article consists of carbon fibre reinforced carbon, there is preferably deposited in the core prior to application thereto of any wrapping of the covering layer sufficient elemental carbon to eliminate significant porosity in the core.

There is preferably deposited in the covering layer sufficient elemental carbon to integrate the fibres of each tow of the covering layer into a substantially non-porous mass of carbon while leaving substantial interstices between adjacent tows. The elemental carbon may be deposited in the covering layer by subjecting the article to carbon vapour deposition for a period within the range 50 hours to 200 hours. The period during which carbon is deposited in the covering layer is preferably in the region of 100 hours.

DESCRIPTION OF THE DRAWING

The accompanying FIGURE illustrates diagrammatically a part of one example of an article in accordance with the invention.

DETAILED DESCRIPTION

In order to facilitate illustration of the internal structure of the article, the article is shown in the accompanying drawing with one end portion severed therefrom. The article comprises a cylindrical core 1 of carbon fibre reinforced carbon on one end portion of which there is a covering layer 2. The covering layer also is formed of carbon but has a character different from that of the core. The core is substantially nonporous; whereas the covering layer has a macroporous character. By the term "macroporous" we mean that the cross-sectional dimensions of the pores of the covering layer are at least 100 micron. The thickness of the covering layer is preferably within the range 1.5 to 2 millimeter.

The core 1 may be made in a known manner. For example, one or more tows of carbon fibre may be coated with an organic binder and laid in a cylindrical mould with the lengths of the fibres substantially parallel to the axis of the mould and then subjected to pressure and heat to consolidate the mixture of fibres and binder and to cause the binder to bind the fibres together. Further layers of tows may be applied. In one or more of these further layers, the lengths of the fibres may extend circumferentially of the core. The further layers may be consolidated in a mould or by winding the tows under tension.

The binder is one which can be decomposed by heat to deposit elemental carbon and which is capable of binding the tows into a coherent mass. A phenol-formaldehyde novolac resin is a suitable binder. The resin may be used in solution.

The binder is carbonized to deposit elemental carbon on the fibres of the core and further elemental carbon is then deposited in the core, preferably by carbon vapour deposition but alternatively by impregnating the core with carbonaceous material and subsequently carbonising that material. A method of producing the core which involves carbon vapour deposition is described in our published British Patent Specification No. 1,330,519.

The deposition of elemental carbon in the core may be carried out in a single step. Alternatively, elemental carbon may be deposited in an inner part of the core prior to application thereto of an outer part of the core. The amount of elemental carbon deposited is approximately the maximum amount which can be deposited in the core so that microporosity which exists in the core immediately after carbonisation of the binder is substantially eliminated.

The particular example of covering layer illustrated in the drawing comprises two wrappings, namely an inner wrapping 3 and an outer wrapping 4. The inner wrapping 3 consists of a piece of pre-woven carbon fibre cloth of a size such as to cover the surface of that part of the core 1 which is to bear the covering layer 2 with a single thickness of the cloth. If required, more than one thickness of the carbon fibre cloth may be applied to the core. The cloth is woven from tows of carbon fibre, the warp and weft sets of tows crossing each other at right angles. The cloth may be arranged on the core with either the warp or the weft extending parallel to the axis of the core. Prior to application of the wrapping 3, the core may be coated with a binder as used in the production of the core, in order to secure the inner wrapping 3 on the core.

After the inner wrapping 3 has been applied to the core, the fibres of the inner wrapping are bound to the core by the deposition of elemental carbon on the fibres and on the core. The elemental carbon may be deposited by carbon vapour deposition. Additionally or alternatively, a coating of an organic binder on the core and/or on the inner wrapping 3 may be carbonized to deposit elemental carbon on the core and on the fibres of the inner wrapping. There is deposited on the fibres of the inner wrapping 3 sufficient elemental carbon to bind together the fibres of each tow. There is preferably deposited sufficient elemental carbon to incorporate the fibres of each tow in a substantially non-porous mass of carbon fibre reinforced carbon.

After the deposition of elemental carbon in the inner wrapping 3, there remain between adjacent tows of the inner wrapping substantial interstices. Owing to the woven nature of the inner wrapping, these interstices are not filled by elemental carbon even when the inner wrapping is subjected to carbon vapour deposition for a period of approximately one hundred hours.

After the inner wrapping 3 has been bonded to the core by elemental carbon, the outer wrapping 4 is applied. In the particular example illustrated, this outer wrapping comprises a braid of carbon fibre tows 5. Adjacent tows of this braid are spaced considerably further apart than are the tows comprised by the woven inner wrapping 3 and therefore the interstices 6 between adjacent tows of the outer wrapping are considerably larger.

The outer wrapping 4 may be applied to the inner wrapping 3 in a manner similar to that in which the inner wrapping is applied to the core. However, if an organic binder is used to attach the outer wrapping 4, the amount of organic binder applied is not so great as to fill completely the interstices of the inner wrapping 3. After the outer wrapping has been applied, it is bonded to the inner wrapping 3 by deposition of elemental carbon on the fibres of the outer wrapping and on the inner wrapping. This may be effected in the same manner as the deposition of elemental carbon on the fibres of the inner wrapping and the core.

It will be understood that deposition of elemental carbon in the outer wrapping 4 will inevitably be accompanied by deposition of some further elemental carbon in the inner wrapping 3. If preferred, the deposition of elemental carbon in the inner and outer wrappings to bind them together and to the core may be effected in a single step. It is also within the scope of the invention to carry out deposition of elemental carbon on the fibres of the core 1 and the fibres of the covering layer 2 in a single step. Since the interstices or pores of the covering layer 2 are much larger than the pores formed in the core 1 by carbonisation of the binder, deposition in the core of sufficient elemental carbon substantially to eliminate the porosity thereof can be effected without filling up the interstices of the covering layer.

If required, the core, the inner wrapping 3 or the outer wrapping 4 or more than one of these may be impregnated with a solution of coloidal graphite prior to the deposition of elemental carbon therein.

The carbon fibre material used for the wrappings of the covering layer 2 is selected according to the required dimensions of the interstices of the covering layer. Preferably, a sufficient number of the selected wrappings are applied to provide a covering layer having a thickness within the range 1.5 to 2 millimeter.

The size and number of interstices present in the covering layer are determined by the spacing between adjacent tows in each wrapping, by the thickness of the tows (which depends on the number of fibres in the tow) and by the degree to which the tows spread when they are wrapped around the core.

In some cases, particularly where the core has a small diameter, we prefer to arrange the warp and weft of one or more wrappings, particularly wrappings such as braid with relatively thick tows, inclined to the longitudinal axis of the core. Any angle of inclination may be selected. We find it particularly convenient to incline the warp and weft equally to the longitudinal axis.

In a case where an organic resin binder is used when applying the wrappings to the core 1, the weight of resin is within the range 10% to 15% of the weight of the wrapping. With this amount of resin, the interstices in the wrapping are not blocked.

The invention may be applied to prostheses to be implanted in living tissue. For example, that part of the article illustrated in the accompanying drawing which includes the covering layer 2 may be implanted in a bore formed in a bone of an amputated limb. That part of the core which is exposed outside the covering layer may project from the bone and provide a means of attachment of an artificial extension to the limb.

I claim:

1. An article comprising a core covered by a covering layer, the covering layer comprising a plurality of tows of carbon fibres bonded by carbon to the core wherein, in the covering layer, each tow of fibres is incorporated in a substantially non-porous mass of carbon fibre reinforced carbon, and there being defined between adjacent tows substantial interstices.

2. An article according to claim 1 wherein the core has an end portion which is exposed outside the covering layer.

3. An article according to claim 1 which is of elongated shape.

4. A method of applying the covering layer to the core of an article according to claim 1 wherein a plurality of wrappings, each comprising a plurality of carbon fibre tows which cross each other, are applied to the core one over the other and wherein elemental carbon is deposited on the fibres to bind said wrappings to each other.

5. A method according to claim 4 wherein the elemental carbon is deposited by carbon vapour deposition.

6. A method according to claim 4 wherein there is wrapped around the core a pre-woven cloth comprising tows of carbon fibres which cross each other.

7. A method according to claim 4 wherein there is deposited in the covering layer sufficient elemental carbon to integrate the fibres of each tow of the covering layer into a substantially non-porous mass of carbon while leaving substantial interstices between adjacent tows.

8. A method according to claim 7 wherein, when said overlying wrapping is applied, it has interstices which are larger than the interstices defined by the inner wrapping when the inner wrapping is applied.

* * * * *